United States Patent [19]

Kiyonaga

[11] 4,185,984
[45] * Jan. 29, 1980

[54] PROCESS FOR PRODUCING GLASS IN A ROTARY FURNACE

[75] Inventor: Kazuo Kiyonaga, Tarrytown, N.Y.

[73] Assignee: Union Carbide Corporation, New York, N.Y.

[*] Notice: The portion of the term of this patent subsequent to Dec. 6, 1994, has been disclaimed.

[21] Appl. No.: 917,561

[22] Filed: Jun. 21, 1978

Related U.S. Application Data

[63] Continuation-in-part of Ser. No. 875,550, Feb. 6, 1978, abandoned.

[51] Int. Cl.² .................................................. C03B 5/16
[52] U.S. Cl. .................................... 65/135; 65/134; 65/27; 65/335; 65/337; 264/30
[58] Field of Search ................... 65/135, 27, 137, 337, 65/134, 335; 264/30

[56] References Cited

U.S. PATENT DOCUMENTS

| | | | |
|---|---|---|---|
| 3,443,921 | 5/1969 | Boivent | 65/134 |
| 3,788,832 | 1/1974 | Nesbitt et al. | 65/135 X |
| 3,880,639 | 4/1975 | Bodner et al. | 65/135 X |
| 4,026,691 | 5/1977 | Lovett et al. | 65/27 |
| 4,045,197 | 8/1977 | Tsai et al. | 65/27 |
| 4,061,487 | 12/1977 | Kiyunaga | 65/135 |
| 4,062,667 | 12/1977 | Hatanaka et al. | 65/135 |
| 4,099,953 | 7/1978 | Rondeaux et al. | 65/134 X |
| 4,113,459 | 9/1978 | Mattmuller | 65/135 |

Primary Examiner—S. Leon Bashore
Assistant Examiner—Frank W. Miga
Attorney, Agent, or Firm—Saul R. Bresch

[57] ABSTRACT

In a process for producing molten glass in a generally cylindrical continuously rotating chamber comprising the following steps:

(a) feeding inorganic raw materials, including silica in major proportion, into the chamber;

(b) providing a flame of high intensity heat produced by the combustion of fuel with a gas containing about 50 to about 100 percent by volume oxygen and directing the flame into the chamber in such a manner that the raw materials are melted; and (c) rotating said chamber at a sufficient speed and cooling the exterior of the chamber with a liquid coolant in such a manner that the inner surface of the chamber is coated with a layer of molten glass, the layer is solidified, and a solidified layer of glass is maintained throughout the process whereby the solidified layer essentially prevents impurities from the inner surface of the chamber from entering the melt; and (d) withdrawing molten glass,
the improvement comprising heating the silica prior to step (a) to a temperature in the range of about 500° F. to about 2500° F.

6 Claims, 1 Drawing Figure

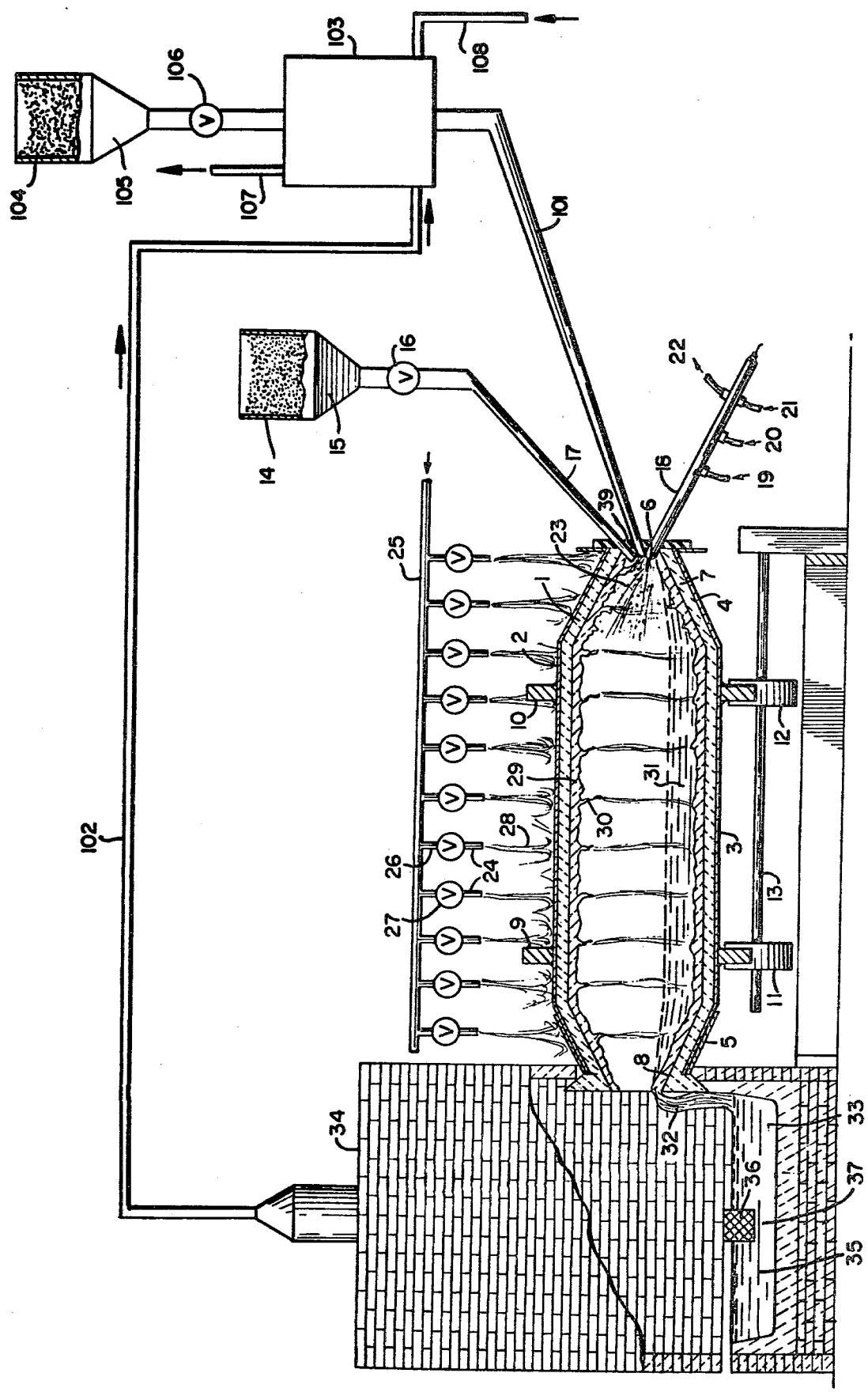

PROCESS FOR PRODUCING GLASS IN A ROTARY FURNACE

This application is a continuation-in-part of application serial number 875,550, filed Feb. 6, 1978 and now abandoned.

FIELD OF THE INVENTION

This invention relates to the melting of inorganic materials to produce molten glass and, more particularly, to an improvement in a process for melting such materials in a rotary furnace.

DESCRIPTION OF THE PRIOR ART

The process described herein is an improvement over U.S. Pat. No. 4,061,487, which patent is incorporated by reference herein.

The term "inorganic raw materials" is used to mean high temperature melting raw materials used in the manufacture of glass. These materials include scrap glass which is usually referred to as cullet. Other examples falling within the definition of "inorganic raw materials" will be mentioned below. The raw materials, properly proportioned and mixed, ready for melting to produce a glass are referred to as "batch." The term "glass" means an inorganic product of fusion which solidifies to a rigid non-crystalline condition upon cooling. Most of the commonly used glasses are silicate glasses. These include container glass, plate glass, borosilicate glass, fused silica, special high melting glasses, glasses designed specifically for subsequent devitrification, sodium silicates, fiber glass, glass wool, slag wool, and rock wool.

The terms "solid" and "solidified," are used to denote the state of the glass when the viscosity is high enough so that it no longer flows appreciably and is in a semi-rigid or rigid state hence appearing to be solid. In the present case, such a "solid" layer of glass forms on the chamber wall or on the refractory lining.

In order to better understand the prior art process, reference is made to the drawing which shows one form of a rotary furnace which may be used in its practice. The portion of the drawing which relates to the improvement will be discussed later in the specification. Rotary furnace 1 comprising a carbon steel shell 2 has a cylindrical section 3, a truncated conical feed section 4, and a truncated conical discharge section 5. The entire inside surface of the furnace shell 2 is provided with a high alumina, refractory lining 7. At the discharge end, furnace 1 is provided with a refractory pouring lip 8 also made of high alumina refractory material. Two flanges 9 and 10 are welded to the straight section 3 of furnace 1. Flanges 9 and 10 are in contact with rollers 11 and 12 which are driven by shaft 13 rotated by a variable speed motor (not shown). Inorganic raw materials 14 are fed to furnace 1 from hopper 15 through a motor driven variable speed rotary valve 16 which is used to control the feed rate of the raw materials into the open mouth 6 of the furnace. Feed pipe 17 near the feed end of the furnace is water cooled (not shown) to protect it since it protrudes several inches into the conical section 4 of furnace 1. A water cooled fuel-oxygen burner 18 which protrudes several inches into opening 6 of furnace 1 is used to provide heat for melting of the raw materials which are discharged into the furnace through pipe 17. Burner 18 is provided with suitable fuel gas lines 19 and oxidizing gas lines 20, and with cooling water inlet and discharge ports 21 and 22, respectively. Burner 18 is tilted at an angle from the horizontal axis of furnace 1 so that the discharge flame 23 and hot combustion gases emanating from burner 18 direct the feed material toward the walls of the furnace. This helps to prevent blowing of fine unmelted particles through the furnace and out the discharge end. By directing the flame and raw material feed at the walls of the furnace any blown material tends to stick to the walls of the furnace which are covered with a coating of molten glass.

Water cooling is provided to the outside of furnace 1 through a plurality of discharge ports 24. The cooling water is supplied through a header 25 and a plurality of pipes 26 which provide passages for the water through control valves 27 and direct individual streams of water 28 at the steel shell 2. The cooling effect of the individual water streams causes part of the molten glass to coat the inside of refractory lining 7 in the form of a thin solidified layer or lining 29. This lining 29 is made of the same material as the molten glass and acts to protect the refractory lining 7 from the deteriorating effect of the molten glass. Because individual streams of water 28 are being projected onto the outer surface of shell 2, the shell is not uniformly cooled, but rather has annular cold bands running around the circumference of the shell. This causes some of the molten glass to solidify in annular ridges 30 on the inside surface of the furnace. The molten glass drips down from these ridges and forms a pool 31 at the bottom of the furnace. As the ridges 30 rotate toward the bottom, they tend to flatten out somewhat, but still remain as solidified ridges. Since furnace 1 is tilted slightly forward, toward the discharge end, the molten pool 31 moves slowly toward the discharge end, and eventually the molten glass flows out over lip 8 of the furnace.

The overflow 32 flows into refining chamber 34 which includes a refining zone 33 and a cooling or conditioning zone 35. These zones are separated by a refractory skimmer block 36. Block 36 causes the refined molten glass to flow from zone 33 to zone 35 through a neck section 37 thereby skimming off the top layer of molten glass which tends to contain gas bubbles. The molten glass from chamber 35 can be fed directly to a glass or fiber forming machine. The refining chamber 34 is constructed of refractory bricks and the chambers 33 and 35 are lined with conventional refractory materials.

There are several advantages of using oxygen or 50% or more oxygen instead of air alone as oxidant in the flame. When oxygen is used, the considerably higher temperature produced markedly increases the rate of heat transfer from flame to unmelted raw material thus shortening the time necessary for adequate melting; the thermal efficiency is improved due to the elimination or reduction in nitrogen volume and due to reduction in heat loss surface area because of the smaller size melter; and there is a significant reduction in blowing of the batch due to the smaller gas volume produced per unit of heat input. To obtain all of these advantages, it is preferred that the oxidant gas to the burner contain from about 50 to about 100 percent oxygen. In conventional glass melting furnaces as well as in rotating furnaces of an earlier vintage, the continuous use of such high concentrations of oxygen in the burner would be disastrous as it would cause rapid melting of refractory and eventual destruction of the furnaces.

It is found that the problem of using high concentrations of oxygen is solved by the use of a solidified layer of glass, which is directly in contact with the inside surface of the furnace shell or in contact with a refractory of maximum thickness described below such as refractory lining 7, which, in turn, is in contact with the inside surface of the water cooled furnace shell. In either case, the solidified glass adheres to the substrate, be it the shell or the refractory, and is maintained by external cooling provided by a liquid coolant. Thus, the solidified portion of the glass provides additional insulation and a protective layer and any melting of this "lining" during exposure to the high temperature flame during rotation does not contaminate the molten glass as they both have the same composition. Further, the external cooling of the revolving chamber serves to constantly replenish the solid layer of glass.

If a refractory lining is used, the thickness of the refractory is an important variable in the practice of the process. Too thick a refractory layer is undesirable as the inner face of the refractory is caused to melt and thus contaminate the glass product. In such a case, melting of the refractory continues until an equilibrium thickness is reached and a solidified layer of glass is formed on the refractory surface due to the external cooling of the shell. During this period and for a considerable time afterwards until the melting and refining zones are cleaned of refractory contaminants, the product quality will be diminished.

As noted there can be no refractory or the refractory can be a very thin layer. The only effect is that the thinner the layer of refractory, the higher the heat flux during startup. Since the glass when solidified is a good insulator at low temperatures, the negative effect of the high heat flux for the limited startup period is nullified for the most part. A refractory layer is preferred, however, because, in practice, it is simpler to place a layer of solidified glass over a refractory than directly against a metal shell.

In view of the foregoing, it is suggested that the maximum thickness of the refractory be limited as described below. Minimum thicknesses are a matter of practicality and are left to the choice of the operator.

The maximum thickness of the refractory layer is determined primarily by the temperature that is to be maintained at the interface between the refractory and solidified glass layers. With adequate external cooling, this interface is maintained at such temperatures that the glass adhering to the refractory is sufficiently viscous that it does not undergo appreciable flow and is in a semi-rigid or rigid state. Thus, the interface temperature does not exceed about the flow point temperature of glass defined as the temperature at which the glass has a viscosity of $10^5$ poise, which, depending upon the composition, usually ranges between about 1600° F. and about 1800° F. Preferably, the temperature at the refractory/glass interface is kept below the softening temperature of the solidified glass. The softening temperature of the solidified glass corresponds to the temperature at which the glass has a viscosity of $10^{7.5}$ to $10^{8.0}$ poise and generally ranges between about 1200° F. and about 1600° F. The maximum thickness of the refractory layer may be calculated by use of the following equation:

$$X = (K(T_1 - T_2)/C)$$

wherein:
X = the maximum thickness in feet
K = the average thermal conductivity of the refractory layer between $T_1$ and $T_2$ in BTU per square foot of refractory area per °F. per hour per foot of refractory thickness
$T_1$ = the flow point temperature of the glass in °F.
$T_2$ = the average temperature of the external surface of the chamber in °F.
C = the average rate of removal of the heat from the external surface of the chamber in BTU per hour per square foot of surface.

It should be noted that for reasons already stated the thickness of the refractory layer calculated by use of the above equation represents about the thickness useful to maintain the temperature at the glass/refractory interface at $T_1$ or below, $T_1$ being such that the viscosity of the glass is sufficiently high that it is presumed to be solid. Typical heat removal rates (C) obtained in the subject rotary glass melter normally range from about 4,000 BTU/hr/ft² to about 15,000 BTU/hr/ft². Since the thermal conductivity of most of the refractories used in glass melting applications average, over a temperature range of 200° to 1600° F., from about 0.6 to 1.5 BTU per sq ft per hour per degree Fahrenheit per foot of thickness, the calculated range of maximum refractory thicknesses based on these refractories is shown to vary from about 0.03 feet to about 0.6 feet. This is in marked contrast to conventional glass melting furnace refractory thicknesses of 1.0 to 1.5 feet for crowns and 1 to 2 feet for sidewalls and bottoms.

Since in the present process the refractory layer having the suggested maximum thickness is not melted or degraded, almost any type of refractory material may be used provided it has a sufficiently high melting temperature and sufficient strength to support the solidified layer of glass and the molten glass itself. Thus, alumina, chrome-magnesite, magnesia, silica, and other refractory materials may be used. In order to obtain good contact between the refractory layer and the metal shell for efficient heat transfer, refractories of the types normally referred to as ramming mixes, plastic refractories, and castables may be used in combination with suitable attachment devices such as J-hooks, studs, or pins affixed to the shell. Bricks may also be used provided that good contact is made with the water cooled shell.

Rotation of the melting chamber serves to provide good mixing of the molten glass to produce a homogeneous glass mixture. At the batch feed end, the rotation aids in distributing the unmelted batch over the pool of molten glass to better expose it to the flame. The rate of rotation need not be very high as there is no intention to use centrifugal force to distribute the molten glass to the walls of the chamber. Another reason for rotating the chamber is to continuously coat the inside surface of the chamber so that, in combination with the external cooling provided, the solid layer of glass which is partially melted during the period of exposure to the hot flame is replenished. A wide range of rotation rates may be used. The most important consideration is that the rotation rate be sufficiently high so that, during the period that the wall is exposed to the high temperature flame, the solid layer of glass is not completely melted through to expose the refractory layer. Rotation rates of about 0.5 to about 30 rpm are satisfactory although a preferred range of rotation speed is about 1 to about 10 rpm.

Cooling of the exterior surface of the rotating shell with a liquid coolant may be accomplished by any of the following methods. For example, the lower section of the rotary furnace may be immersed in a cooling fluid bath; an annular cooling jacket may be used; a suitably designed spray or curtain of fluid may be used; and a pattern of directed streams as shown in the drawing may also be used. The cooling may be uniform to provide a smooth layer of solid glass or non-uniform to provide the annular ridges described above. Any conventional cooling fluid may be used, water being preferred. As noted, the cooling means must be sufficiently adequate that a solid layer of glass is formed and maintained within the rotating furnace. Exterior temperatures are expected to vary depending upon distance from the flame and location of the cooling zones but are usually maintained at an average of about 200° F. to about 600° F. It is desirable, that the cooling means utilized be capable of removing from about 4000 to about 15,000 BTU per square foot per hour since heat fluxes in approximately these ranges are needed to maintain a solid layer of glass.

Any of the conventional fuels may be used, e.g. natural gas, kerosene, fuel oils, or producer gas. Gas temperatures inside the furnace range from about 3000° F. near the discharge end to about 5000° F. at the oxygen-fuel flame.

In the described process, it is apparent that the melting of the raw materials is energy intensive. Thermal efficiency, therefore, becomes very important in glass production economics. To improve thermal efficiency, it has been suggested that heat contained in the furnace off-gases be used to preheat the batch mixture, i.e., the inorganic raw materials, but it is found that preheating this mixture causes partial melting of the batch ingredients resulting in a sticky mass whose flow is difficult, if not impossible to control. Further, the batch mixture contains particles ranging in size from fine powder to granular materials. When directly contacted with hot gases, there is a preferential carry-over of fine particles with the gases, which affects the composition of the glass. For these reasons, preheating of the batch mixture is not practiced commercially.

SUMMARY OF THE INVENTION

An object of this invention is to provide an improvement over prior art processes for producing glass in a rotary furnace by increasing thermal efficiency without melting all or part of the batch mixture prior to its introduction into the rotary furnace and without preferential carry-over of fines.

Other objects and advantages will become apparent hereinafter.

According to the present invention, such an improvement has been discovered in a process for producing molten glass in a generally cylindrical continuously rotating chamber comprising the following steps:

(a) feeding inorganic raw materials, including silica in major proportion, into the chamber;

(b) providing a flame of high intensity heat produced by the combustion of fuel with a gas containing about 50 to about 100 percent by volume oxygen and directing the flame into the chamber in such a manner that the raw materials are melted; and (c) rotating said chamber at a sufficient speed and cooling the exterior of the chamber with a liquid coolant in such a manner that the inner surface of the chamber is coated with a layer of molten glass, the layer is solidified, and a solidified layer of glass is maintained throughout the process whereby the solidified layer essentially prevents impurities from the inner surface of the chamber from entering the melt; and (d) withdrawing molten glass,
the improvement comprising heating the silica prior to step (a) to a temperature in the range of about 500° F. to about 2500° F.

BRIEF DESCRIPTION OF THE DRAWING

The sole FIGURE of the drawing, which has been referred to heretofore in connection with the prior art, is a diagrammatic cross-sectional view of one form of apparatus in which the process of the invention can be carried out.

DESCRIPTION OF THE PREFERRED EMBODIMENT

The glasses with which the subject process is concerned are silicate glasses and the "inorganic raw materials" include silica in major proportion, i.e., at least about 50 percent by weight and usually at least about 65 percent by weight silica. The inorganic raw materials commonly used for making silicate glasses include: silica, feldspar, limestone, dolomite, soda ash, potash, borax and alumina. Minor ingredients such as arsenic, antimony, sulfates, and fluorides are frequently added to alter the properties of the glass. In addition, other metal oxides are often added to obtain the desired color. Metallurgical slags and naturally occurring rock are used in the production of slag wool and rock wool. Generally, these materials are classified into three categories: (1) glass forming oxides, which include silica and boric oxide; (2) stabilizing oxides, which include aluminum oxide, calcium oxide, and magnesium oxide; and (3) fluxes such as sodium oxide, potassium oxide, and fining agents. Although commercial glasses are reported to contain about 55 to about 94 percent glass formers, about 2 to about 30 percent stabilizers, and about 1.5 to about 22 percent fluxes, the common glasses used for windows and bottles contain about 70 to about 75 percent silica and about 12 to about 17 percent fluxes.

Proportionwise, the inorganic raw materials used in subject process preferably comprise (a) inorganic raw materials, which alone or in mixture with each other melt at a temperature of less than about 2500° F., in an amount of about 6 percent to about 45 percent by weight, e.g., cullet, sodium carbonate, sodium sulfate, potassium carbonate, potassium sulfate, and iron oxide, and (b) inorganic raw materials, which alone or in mixture with each other melt at a temperature greater than about 2500° F., in an amount of about 55 percent to about 94 percent by weight, e.g., silica, limestone, alumina, and magnesia, percent by weight being based on the total weight of the inorganic raw materials. In any case, silica is present in an amount of at least about 50 percent by weight of the total inorganic raw materials and preferably about 75 percent by weight, as noted above.

Silica sand, another common inorganic raw material, is almost pure silica and may contain one or more of the stabilizing oxides mentioned as an impurity.

Referring to the drawing:

In the prior art embodiment, all of the inorganic raw materials 14 are fed from hopper 15. In subject process, the inorganic raw materials are preferably divided so that silica and any other inorganic raw materials, which, in mixture with the silica or each other, will melt at a temperature of no less than about 2500° F., are placed in hopper 105. These are designated as inorganic raw materials 104.

The remaining raw materials, usually including cullet, are placed in hopper 15 and are designated inorganic raw materials 14.

Inorganic raw materials 104 are fed from hopper 105 through a motor driven variable speed rotary valve 106 which, in the same fashion as valve 16, is used to control the feed rate of raw materials 104. Thus, the raw materials 14 and 104 are fed to furnace 1 via separate streams and are thoroughly mixed by the action of the rotating furnace 1.

On its path to the furnace, raw materials 104 pass through direct heat exchanger 103 where they are contacted with the furnace off-gases moving through line 102 and/or combustion gases entering heat exchanger 103 through line 108. The gases are introduced into heat exchanger 103 at about the bottom and they contact raw materials 104 countercurrently. The gases exit heat exchanger 103 through line 107 after they have made contact with and preheated raw materials 104 to a temperature in the range of about 500° F. to about 2500° F., which is below the melting temperature of silica or any of the other raw materials, alone or in combination. Preheating is preferably, however, at a temperature below about 2000° F. to essentially avoid all melting, partial fusion, or sintering, which could form a sticky mass and thus impede the flow of raw materials into the furnace.

An example of how subject process improves the overall thermal efficiency of the glass producing operation is shown in the production of bottle glass from batch where the inorganic raw materials contain 74 percent by weight silica. In this example, the silica, which would be inorganic raw materials 104, is heated in heat exchanger 103 to 1500° F. The other inorganic raw materials are not heated, but introduced from hopper 15.

It is found that the heating of the silica to 1500° F. reduces the furnace duty per ton of glass as follows: 0.74×2000 pounds/per ton of glass×0.25 BTU per pound per °F.×(1500−70)°F=529,000 BTU/ton of glass.

Since the total heat that must be transferred to produce molten glass in the rotary furnace described herein is approximately 1,800,000 BTU per ton, preheating according to this example reduces the net furnace duty by about 29%.

To further improve the thermal efficiency, some of the stabilizing oxides such as alumina, calcia, calcium carbonate, magnesia, or magnesium carbonate or other inorganic raw materials may be mixed with the silica provided that the mixture or any of its components do not essentially melt or fuse at less than about 2500° F. The other inorganic raw materials are added via hopper 15 and are added to furnace 1 at a rate proportional to the feed rate of the other.

The heat in heat exchanger 103 is provided by either the furnace off-gas through line 102 or from external sources such as combustion gases flowing through line 108 or a combination of both. These combustion gases can be formed from a fuel and air mixture in much the same way as the gases coming from burner 18, or they can be hot off-gases from other operations. The most economic are the off-gases from furnace 1 supplemented, where they are insufficient, by hot gases from external sources. Since the temperature of the furnace off-gas can reach as high as 3000° F. and the temperature of the combustion gases from the fuel-air mixture can reach as high as 3600° F., the amounts of each used has to be regulated in accordance with the amount of inorganic raw materials 104, which is usually at ambient temperature, so that the raw materials will not be heated to a temperature higher than about 2500° F. and preferably about 2000° F.

It was previously pointed out that the heating of the silica or mixture of inorganic raw materials in heat exchanger 103 is preferably accomplished by direct contact with the off-gases in a countercurrent mode. Since the silica is generally used in granular form with very little fines, loss by carryover in the gas stream is minimal. The heat exchanger 103 may be a vertical hollow shaft in which the hot gases flow upward while the silica, as silica sand, is sprayed into the shaft at the top and collected at the bottom where it passes through line 101 to furnace 1. Fluidized beds may also be used in which the hot gases act as a fluidizing medium. For better heat recovery, a multiple fluid bed system is preferred with silica sand and hot gases contacting each other in countercurrent fashion. Another method of direct heat exchange between hot gases and silica sand, which is at ambient temperature, is to mix the two streams, i.e., the gas stream and the sand stream in countercurrent stages and then to separate them in cyclone separators in each stage. This type of apparatus is often referred to as a suspension preheater, which is widely used in cement plants in Europe and is now gaining popularity in the United States. Whatever the construction of the heat exchanger, it is preferable to use more than one stage, 2 to 4 or more.

The temperature to which inorganic raw materials 104 can be heated will depend on various factors as the volume rate of the off-gases, the temperature of the off-gases, the feed rate of the inorganic raw materials, and the number of contact stages in the heat exchanger. Although any degree of additional pre-heat serves to improve the overall thermal efficiency of the rotary furnace, it is desirable that the raw materials be heated to at least 500° F. and preferably at least about 1500° F.

It has been noted above that the rotary furnace is fired with fuel and oxygen, the oxygen representing a major operating cost item. The oxygen consumption can be reduced by transferring more of the heat duty to the heat exchange system. This can be accomplished by adding another stage to the system represented by heat exchanger 103 or by having an externally located stage, the added stage being fired by fuel and air. The gases from this stage pass through line 108 and are usually combined with the off-gases and used in the remaining stages to heat incoming silica sand.

I claim:

1. In a process for producing molten glass in a generally cylindrical continuously rotating chamber comprising the following steps:
   (a) feeding inorganic raw materials comprising
   (i) inorganic raw materials, which alone or in mixture with each other melt at a temperature of less than about 2500° F., in an amount of about 6 percent to about 45 percent by weight; (ii), inorganic raw materials, which alone or in mixture with each other melt at a temperature greater than about 2500° F. in an amount of about 55 percent to about 94 percent by weight; and (iii) silica, as a component of (ii), in an amount of at least about 50 percent by weight, percent by weight being based on the total weight of the inorganic raw materials, into the chamber;

(b) providing a flame of high intensity heat produced by the combustion of fuel with a gas containing about 50 to about 100 percent by volume oxygen and directing the flame into the chamber in such a manner that the raw materials are melted; and (c) rotating said chamber at a sufficient speed and cooling the exterior of the chamber with a liquid coolant in such a manner that the inner surface of the chamber is coated with a layer of molten glass, the layer is solidified, and a solidified layer of glass is maintained throughout the process whereby the solidified layer essentially prevents impurities from the inner surface of the chamber from entering the melt, and (d) withdrawing molten glass, the improvement comprising heating the inorganic raw materials of (ii), including the silica, just prior to step (a) to a temperature im the range of about 500° F. to about 2500° F.

2. The process defined in claim 1 wherein the heating prior to step (a) is to a temperature in the range of about 1500° F. to about 2000° F.

3. The process defined in claims 1 or 2 wherein a hot off-gas exits the chamber and is used to provide at least part of the heat for the heating prior to step (a).

4. The process defined in claims 1 or 2 wherein hot gases are used for the heating prior to step (a) and the heating is accomplished by direct heat exchange in the countercurrent mode.

5. The process defined in claim 2 wherein the silica is present in an amount of at least about 65 percent by weight.

6. The process defined in claim 2 wherein cullet is present as a component of (i).

* * * * *